United States Patent [19]

Peil

[11] Patent Number: 4,885,671

[45] Date of Patent: Dec. 5, 1989

[54] PULSE-BY-PULSE CURRENT MODE CONTROLLED POWER SUPPLY

[75] Inventor: William Peil, North Syracuse, N.Y.

[73] Assignee: General Electric Company, Philadelphia, Pa.

[21] Appl. No.: 172,606

[22] Filed: Mar. 24, 1988

[51] Int. Cl.⁴ .......................................... H02M 3/335
[52] U.S. Cl. ....................................... 363/17; 363/26; 363/134
[58] Field of Search ...................... 363/16, 17, 24, 25, 363/26, 97, 98, 131, 132, 133, 134

[56] References Cited

U.S. PATENT DOCUMENTS

| | | | |
|---|---|---|---|
| 3,219,756 | 11/1965 | Rousin | 178/7.5 |
| 3,636,430 | 1/1972 | Kernick et al. | 362/41 |
| 3,987,356 | 10/1976 | Steigerwald | 363/44 |
| 4,197,515 | 4/1980 | Hornfeldt et al. | 333/165 |
| 4,236,197 | 11/1980 | Shelly | 363/41 |
| 4,262,328 | 4/1981 | Bloom et al. | 363/16 |
| 4,322,817 | 3/1982 | Kuster | 363/26 |
| 4,331,978 | 5/1982 | Nowaczyk | 358/190 |
| 4,424,556 | 1/1984 | Maeda et al. | 363/17 |
| 4,464,606 | 8/1984 | Kane | 315/158 |
| 4,471,269 | 9/1984 | Ganser et al. | 315/307 |
| 4,503,364 | 3/1985 | Engel | 315/308 |
| 4,504,895 | 3/1985 | Steigerwald | 363/17 |
| 4,533,986 | 8/1985 | Jones | 363/17 |
| 4,535,271 | 8/1985 | Holmes | 315/224 |
| 4,586,118 | 4/1986 | Mihalka | 363/17 |
| 4,586,119 | 4/1986 | Sutton | 363/17 |
| 4,587,463 | 5/1986 | Allington | 315/307 |
| 4,587,604 | 5/1986 | Nerone | 363/17 |
| 4,594,648 | 6/1986 | Gallios | 363/46 |
| 4,628,426 | 12/1986 | Steigerwald | 363/17 |
| 4,717,994 | 1/1988 | Diaz et al. | 363/132 X |

OTHER PUBLICATIONS

A data sheet for the UC1846/1847 family of PWM control integrated circuit (IC) dated Dec., 1983, and published by Unitrode Corporation, Lexington, Mass., U.S.A., pp. 2-136 to 2-143.

A preliminary data sheet for the UC1825 family of PWM control integrated circuit publication dated 1985, published by Unitrode Corporation, Lexington, Mass., U.S.A., pp. 2-109 to 2-116.

*Primary Examiner*—Patrick R. Salce
*Assistant Examiner*—Kristine Peckman
*Attorney, Agent, or Firm*—Stephen A. Young; Paul Checkovich

[57] ABSTRACT

A power supply for a Xenon lamp of a projection television includes a pulse-width-modulator that is included in a power regulating outer feedback loop and in a current-mode inner feedback loop. A current sensing transformer, responsive to a current in a chopper arrangement of the power supply, generates a signal that is coupled to a lowpass filter. The filter generates a ramping portion of each pulse of a control signal that is coupled to a current sensing terminal of the pulse-width-modulator. A switch operating synchronously with a horizontal sync signal is coupled across a capacitor of the lowpass filter to completely discharge the capacitor prior to the beginning of each ramping portion.

22 Claims, 2 Drawing Sheets

PULSE-BY-PULSE CURRENT MODE CONTROLLED POWER SUPPLY

BACKGROUND OF THE INVENTION

The invention relates to a power supply control circuitry used in, for example, a television apparatus such as a light valve video projection system of the type utilizing an arc-discharge lamp as a source of light.

Arc-discharge lamps have operated satisfactorily as light sources in light valve projection systems. When starting and running an arc-discharge lamp such as a gaseous Xenon lamp it is desirable for proper operation and maintenance that a sequential three phase, ignition, glow to arc transition and arc sustaining procedure be followed. This procedure consists of first coupling a very high voltage to the lamp for causing ionization of the atmosphere between two electrodes of the lamp and a consequent cold arc-discharge therebetween that is referred to herein as Phase I. Next, a relatively low dc voltage, hereinafter referred to as a Phase II open circuit voltage, is applied to the electrodes through a ballast which heats a cathode spot to level of electron emission, thus providing a source of conduction electrons. This process hereinafter is referred to as Phase II. And lastly, a relatively low voltage derived from a high power source is coupled to the lamp, providing a steady state operating condition, which heats the entire cathode and sustains the high brilliance arc that provides the desired lumen output. This condition hereinafter is referred to as Phase III. As an illustrative example, the voltage requirements for a 500 watt Xenon lamp are, approximately, Phase I - 30,000 volts, Phase II - 100 volts and Phase III - 20 volts. The low voltage-high current Phase III arc sustaining power supply is in continuous use after the arc has been "struck". The Phase I and Phase II voltage sources are utilized only during arc ignition and transition and remain idle during the Phase III or run mode. An example of an ignition circuit for an arc discharge lamp is described in detail in U.S. Pat. No. 3,219,756 entitled, IGNITION CIRCUIT FOR AN ARC DISCHARGE LAMP IN A PROJECTION SYSTEM, in the name of A. G. Roussin.

A low voltage-high current arc sustaining power supply, embodying a feature of the invention, includes an arrangement for generating a signal that is indicative of the power level that is delivered to the Xenon lamp via a pair of output terminals and a low level regulator responsive to such power indicating signal. A voltage-to-current converter, embodying an aspect of the invention, comprises this low level regulator, high level power MOS transistor switches, an output transformer, and a rectification and filtering arrangement that is coupled to a secondary winding of the transformer. Included in the regulator is a pulse-width-modulator (PWM) that generates a drive signal for controlling the transistor switches. The switches couple an unregulated DC supply voltage across a primary winding of the output transformer, alternately, at a frequency that is typically selected from a range between 15 kHz to 100 kHz. The switches are conductive in each period during an interval that is controlled by the PWM output signal. A pulsating voltage generated by the switch is applied via the secondary winding of the output transformer to the rectification and filtering arrangement which includes an inductive input filter, and then to the output terminals of the power supply which delivers a DC output current for energizing the Xenon lamp.

The regulator incorporates a first feed-back loop network. In the regulator, the power level indicative signal determines the steady state level of the output current by controlling the peak current in each pulse. The peak current in each pulse determines the duration of the pulses of the PWM output signal and, concommitantly, the pulse width of the pulses of the pulsating voltage across the primary winding and of the pulsating current in the secondary winding of the output transformer. This first, or inner feedback loop of the regulator has a fast reponse time. A second, or power level outer feedback loop of the regulator has a smaller bandwidth and may not be capable of responding fast enough to follow abrupt changes in the output current.

In order to protect the Xenon lamp from a transient overcurrent condition as well as to protect the output stage transistors of the low voltage-high current arc sustaining power supply, it is desirable to prevent rapid increases in the peak amplitude of the nominal current that flows in the output stage.

In one prior art arc sustaining power supply, a voltage source having a low output impedance is formed between a pair of output terminals of the power supply. However, because of the low output impedance of the power supply some transient condition that can occur in the Xenon lamp and/or its ancillary circuitry, may cause an immediate, significant and undesirable change in the current that flows through the Xenon lamp.

SUMMARY OF THE INVENTION

In accordance with a feature of the invention, the pulse-width-modulator controls the pulse width on a pulse-by-pulse current mode basis. Should the load formed at the output terminals of the power supply change fast, the output current, advantageously, would be prevented from changing excessively because of the fast response time of the inner loop that is controlled in part by the peak current flowing in the switches. Operation of the second feedback loop that is responsive to load conditions is slow. The inner feedback loop prevents rapid changes in the peak amplitude of the current in the secondary winding of the output transformer that energizes the lamp load. An excessive increase in the output current, could disadvantageously, reduce the life-time of the Xenon lamp by sputtering metal from the electrodes or possibly even cracking the lamp seals. Likewise, an excessive decrease in the nominal output current might, disadvantageously, cause the Xenon lamp to extinguish. This, in turn, necessitates the initiation of a new ignition start-up sequence as previously described and decreases the lifetime of the electrodes. Minimizing the occurences of start-up sequences is desirable because the lifetime of the Xenon lamp is slightly reduced by each ignition sequence.

In accordance with an aspect of the invention, a signal that is proportional to the amplitude of the pulsating current in the switches is coupled via a filter, embodying another aspect of the invention, to the pulse-width-modulator. The filter generates, during a portion of each period of the filtered output signal, a pulse having a ramping first portion with a rate of change that is indicative of the amplitude of the corresponding pulse of the pulsating current. For a given peak amplitude of the pulsating current the rate of change of the first portion is, advantageously, determined by, for example, an R-C network having a suitable time constant. The first portion is followed by a second portion having a smaller rate of change. The trailing edge of the pulse that follows the second portion is formed by a down-ramping third portion having a relatively short duration.

In accordance with another aspect of the invention, the third portion is followed by a flat, fourth portion that, in each period of the pulsating current, is at a constant predetermined level such as ground potential. The level of the fourth portion is substantially unaffected by any previously occurring current pulses of the pulsating current. In this way, the first portion begins ramping up from the same level at the beginning of each period.

Because the fourth portion of the output signal ends at the constant predetermined level that is unaffected by any previously occurring pulses of the pulsating current, "squegging" in the power supply is, advantageously, reduced and normally prevented. The term "squegging" refers to a steady state situation in which the duration of alternately occurring pulses of the pulsating current is, narrower than that required; whereas, that of the other alternately occurring pulses is wider than that required for obtaining the nominal output run current.

The pulse-width-modulator generates an output signal having a variable duty cycle at a frequency that is determined by its local oscillator that may, in turn, be synchronized to an external sync pulse. When the Xenon lamp is used in a projection television, it is usually desirable to synchronize the lamp power supply to the horizontal frequency of the video signal that provides picture information to be projected or to an integer multiple thereof.

As indicated previously, the power level indicative signal is representative of the power that is delivered to the Xenon lamp. The ramping output signal of the filter is compared with that of the power level indicative signal. When a crossover occurs, the PWM output signal is forced to zero.

For a given level of the power level indicative signal the duration of a given pulse of the PWM output signal and of the pulsating current is determined substantially in accordance with the rate of change of the ramping output signal that is, in turn, determined by the amplitude of the pulsating current. Pulse duration of the PWM output signal can advantageously vary aburptly when a transient condition occurs due to the operation of the first feedback loop that has a fast response time. The first feedback loop prevents rapid changes in the peak amplitude of the output current pulses. The duration of the pulse also varies gradually in accordance with the slowly responding second feedback loop that is controlled by the power level indicative signal.

A power supply apparatus, embodying a further aspect of the invention, includes a source of an input supply voltage, a load circuit and an inductance coupled to the load circuit and to the source of the input supply voltage. A power switch is coupled to the inductance. A control circuit is coupled to the power switch for switching conduction states of the power switch to transfer power from the source to the load circuit and generate an input current in the switch. The input current is sampled in a sampling arrangement to generate a sampled current signal. A lowpass filter including a capacitance is coupled to the sampling arrangement for integrating the sampled current signal. A second switch having a control input terminal that is coupled to the control circuit has main current conducting terminal that is coupled to the filter. The second switch, that is synchronously operated with the power switch, synchronously controls the charge in the capacitance to generate a synchronized ramp signal representative of the input current. The ramp signal is applied to the control circuit to control the switching of the power switch in accordance with the input current on a pulse-by-pulse, current mode basis.

DESCRIPTION OF THE PREFERRED EMBODIMENTS

Figure 1A:
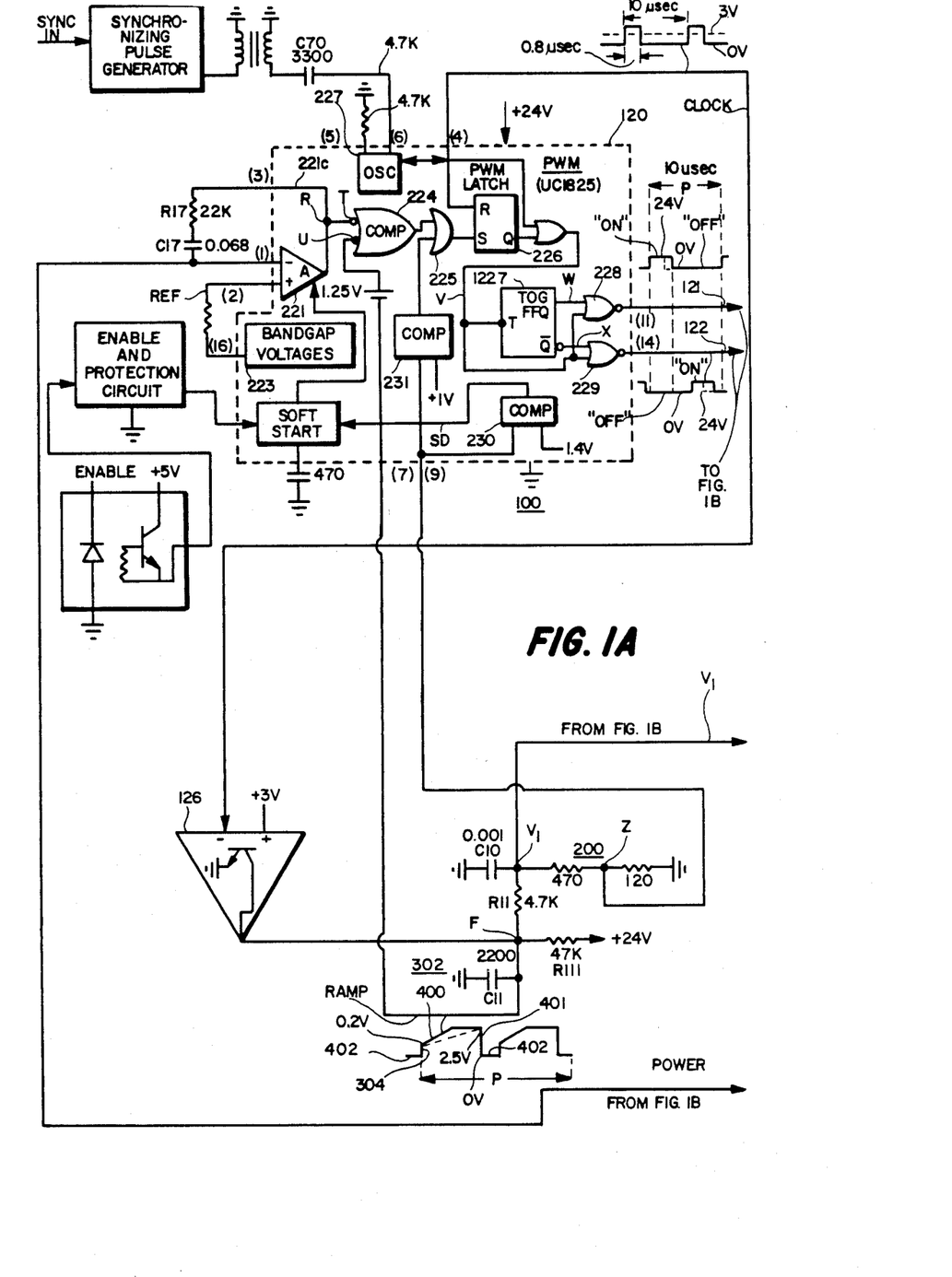
FIGS. 1A and 1B illustrate an arc sustaining power supply for a Xenon lamp that includes a synchronous filter, embodying an aspect of the invention.
Figure 1B:
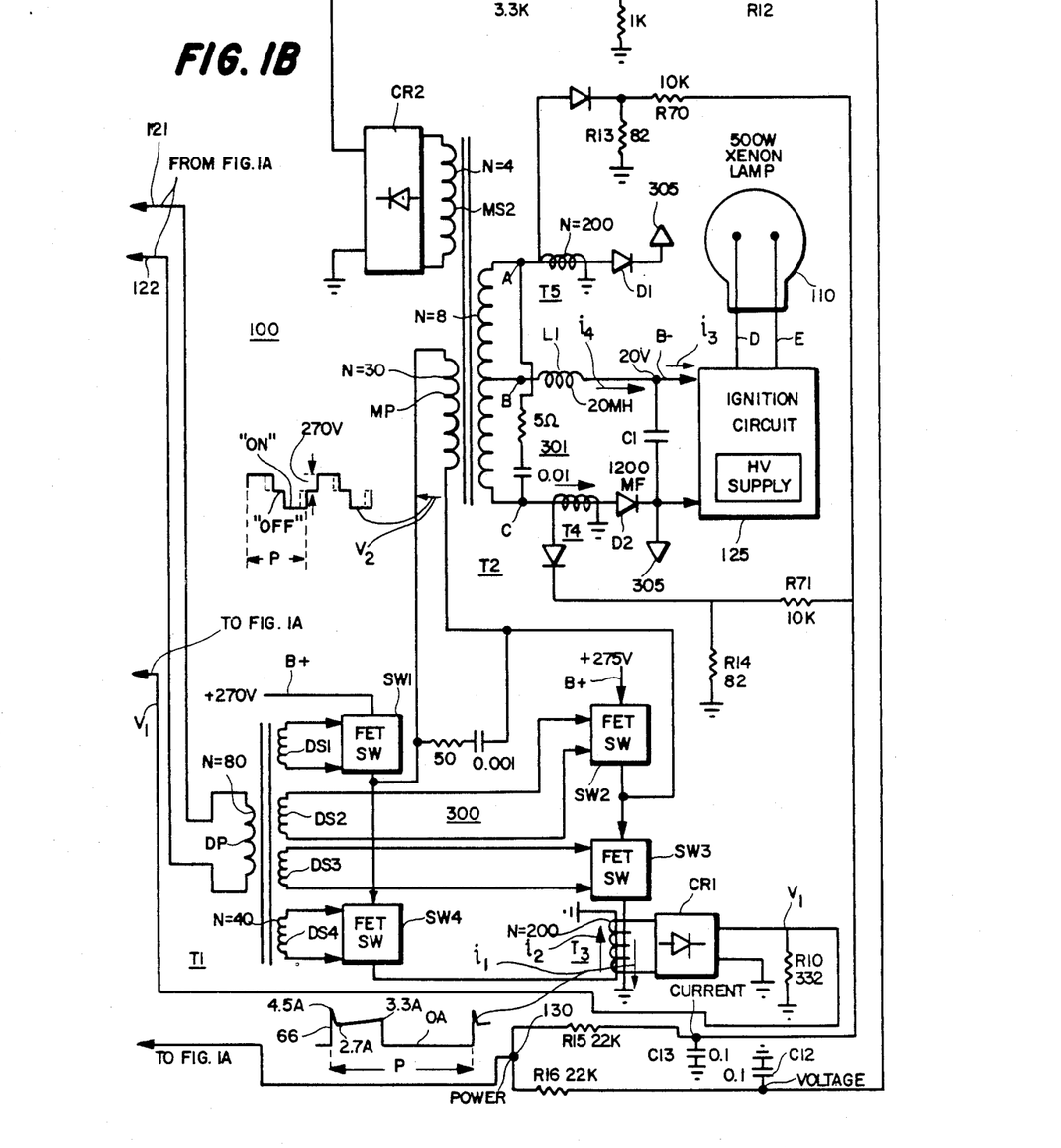

FIGS. 1A and 1B illustrate an arc sustaining low voltage power supply 100 embodying the invention that generates a voltage B— that energizes a Xenon lamp 110. Power supply 100 includes a PWM controller integrated circuit (IC) 120 that generates a pair of periodic output drive signals 121 and 122 having a period P and that are, each, bilevel signals. When, during each period P, signal 121 is at an "ON" level of, for example, +24 volts, signal 122 is at an "OFF" level such as at zero volts, and vice versa. The duty cycle of each of signals 121 and 122 is variable. During a portion of the period P both signals 121 and 122 are always at the "OFF" level or zero volts. Signals 121 and 122 are coupled to corresponding end terminals of a primary winding DP of a driver transformer T1. Four secondary windings, DS1, DS2, DS3, and DS4 of transformer T1, are coupled between corresponding gate and source electrodes of field effect transistor (FET) switches SW1, SW2, SW3, and SW4, operating in a full bridge chopper arrangement. The secondary windings are tightly coupled magnetically to prevent an improper operation of the transistor switch known as simultanlous conduction.

When a given output pulse of signal 121 is at the "ON" level, FET switches SW1 and SW3, for example, are conductive. Consequently, an unregulated DC supply voltage B+ is coupled via switches SW1 and SW3 across a primary winding MP of a main power transformer T2. Similarly, when a given pulse of signal 122 is at the "ON" level, FET switches SW2 and SW4 are conductive and FET switches SW1 and SW3 are nonconductive, causing voltage B+ to be coupled in the opposite sense.

A secondary winding MS1 of transformer T2 that is conductively isolated from winding MP has an end terminal A coupled to a "cold" ground conductor 305 via a rectifier D1 when rectifier D1 is conductive. Similarly, an end terminal C of winding MS1 is coupled to the same cold ground conductor 305 via a rectifier D2. A center tap terminal B of winding MS1 is coupled through a choke L1 to a filter capacitor C1 for developing energizing voltage B— across capacitor C1.

An AC voltage developed across secondary winding MS1 of transformer T2 causes a first pulse of upramping current to flow through one of rectifiers D1 or D2 during the "ON" time of signal 121. A second pulse of upramping current flows through the other of rectifiers D1 or D2 during the "ON" time of signal 122. The current through each of rectifiers D1 and D2 is combined in choke L1 to form a rectified current $i_4$ that is aplied through an arrangement 125 to Xenon lamp 110 which forms the load between terminals D and E. Arrangement 125 includes an ignition circuit for Xenon lamp 110. Such ignition circuit includes, typically, a high voltage power supply and a spark gap. During steady state operation, the voltage between terminals D and C is approximately equal to voltage B— that is developed across capacitor C1 and the current through terminals D and E is approximately equal to the average value of current $i_4$.

A current transformer T4 monitors the current flowing in rectifier D2 and a current transformer T5 monitors that in rectifier D1. The resulting rectified voltages that are developed across corresponding shunt load resistors R13 and R14 are summed in a low-pass filter to produce a signal CURRENT that is nomially at a 5 volt level when load current $i_3$ is at its nominal value. For convenience, five volts is chosen as the voltage level of signal CURRENT because a voltage reference REF in IC 120 is also at 5 volts. In order to obtain low ripple current in the lamp 110, the lowpass filter network in the signal path of signal CURRENT should preferably pass the fundamental frequency of a ripple voltage of voltage B+ and its first significant harmonic. The filter network includes a capacitor C13 and impedance level determining resistors R70 and R71, acting as a combiner.

A winding MS2 that is tightly coupled magnetically to primary winding MP is conductively coupled via a bridge rectifier CR2 to a resistor divider and an R-C network operating as a low-pass filter that includes an impedance determining resistor R12 and a capacitor C12. Consequently, a signal VOLTAGE that is nominally at 5 volts is generated when output voltage B— is at its nominal value. As in the case of signal CURRENT, because of the filtering, signal VOLTAGE does not significantly change during each period P of signal 121 or of signal 122. To minimize lamp ripple current, the bandwidth in the path of signal VOLTAGE should preferably also pass the ripple frequencies of significance of voltage B+.

Signals CURRENT and VOLTAGE are coupled via resistors R15 and R16, that form an equal weighting summing network, to produce, at a terminal 130, a signal POWER that is their algebraic sum. Signal POWER is proportional to the power that is delivered to Xenon lamp 110. It should be noted that for other than nominal voltage and current conditions in Xenon lamp 110, the sum of signals CURRENT and VOLTAGE results in a signal POWER that is slightly different than if a true multiplication of voltage and current were utilized for obtaining signal POWER.

A current $i_1$ in transistor switch SW3 is sensed by a step-up current transformer T3 coupled in a ground return lead of a source electrode S of switch SW3. Similarly, a current $i_2$ in switch SW4 is also sensed by step-up transformer T3. An induced signal in a secondary winding of transformer T3 is rectified in a bridge rectifier CR1 having an output terminal that develops a signal $V_1$ across a shunt resistance. Signal $V_1$ is coupled to an input terminal of a synchronous low-pass filter 302, embodying an aspect of the invention for generating a signal RAMP. Filter 302 that includes a resistor R11 and a capacitor C11 generates an upramping portion 400 of signal RAMP substantially throughout each of the pulses that are included in current $i_1$. A portion 401 that varies in the opposite sense to that of portion 400 of signal RAMP is actively generated by an output transistor of a comparator 126 that, as described later on, discharges capacitor C11 synchronously with the operation of switch SW1. That is, portion 401 is a down-ramping part of signal RAMP having a relatively short duration. Upramping portion 400 of signal RAMP is required for controlling IC 120, as described later on.

In accordance with another aspect of the invention, the average slope or rate of change of portion 400 is significantly affected by the cutoff frequency of filter 302. Portion 400 occurs substantially throughout the duration of the pulse of current $i_1$. In contrast, a prior art circuit utilizes the slope of a current that is analogous to current $i_1$ for generating the required monotonically increasing control signal that is used for controlling its pulse-width-modulator without using a filter such as filter 302. By using filter 302 and by discharging capacitor C11 of filter 302 with comparator 126 it is, advantageously, possible to incorporate a lower cutoff frequency in filter 302 than would otherwise be possible in such prior art circuit. Therefore, the effects of noise are substantially reduced in upramping portion 400 relative to those in the monotonically increasing control signal of the prior art.

Immediately upon the closure of switches SW1 and SW3, for example, a spike 66 of current $i_1$ flows in switch SW3. Current $i_1$ flows as a result of charging the parasitic capacities of MOS transistor switch SW3, those associated with a heat sink of transistor SW3, not shown in the FIGURE, and those of transformer T2. In addition, current $i_1$ flows as a result of the action of a primary snubber network 300 and of a magnetizing current of transformer T2. Furthermore, current $i_1$ flows as a result of a reflected secondary current which has its main contributors a DC load current $i_3$, an input ripple current of a current $i_4$ that flows in a choke L1, a stored charge in, for example, rectifying diode D1 and current in a secondary snubber network 301.

The portion of the current spike in current $i_1$ resulting from charging the parasitic capacitances that are mentioned above is very narrow, that is, typically, 50–200 nanoseconds compared to a half-period P/2 in the FIGURE of 5 microsecond. The current spike resulting from primary snubber network 300 has a 0.055 microsecond time constant. Although current spike 66 is over very quickly, the peak of the current spike from these two sources may exceed, during normal operation, the normal operating peak current in switch SW3.

In accordance with a further aspect of the invention, the effect of current spike 66 in transistor switch SW3 on signal RAMP is drastically reduced in magnitude by synchronous filter 302. Advantageously, a very long integrating time constant of, for example, 10.3 microseconds, may be chosen because synchronous filter 302 is used. As a result, the large spike of current only manifests itself as a small initial step 304 that precedes upward ramping waveform portion 400 of signal RAMP, shown in the FIGURE.

When each one of signals 121 and 122 is at its respective "ON" level, signal RAMP is an upramping signal having a rate of change that is approximately proportional to signal $V_1$ at the output of bridge retifier CR1. When signal $V_1$ becomes larger, for example, due to current $i_1$ and $i_2$ becoming larger, signal RAMP has a higher rate of change. The peak voltage on signal RAMP is approximately indicative of the intergal of the average of current $i_3$ in the load, i.e., in lamp 110.

An oscillator 227 of IC 120 that is typically of the sawtooth oscillator type generates a signal CLOCK having a frequency that is determined by an external resistor and by an external capacitor C70. Additionally the discharge time of the sawtooth oscillator is determined by external capacitor C70 and by an internal discharge mechanism. This discharge time is conventionally called the "dead time" and is an interval during each clock cycle when both signals 121 and 122 are forced to the "OFF" level. This forcing to the "OFF" level overrides the effects of all other input signals to IC 120. A positive going pulse, that is generally referred to as the dead time pulse, or sync pulse, exists on pin 4 of IC 120 and is more positive during the discharge of timing capacitor C70. The frequency of signal CLOCK of oscillator 227 is thus twice the fundamental frequency of that of voltage $V_2$ developed across winding MP of transformer T2, hereinafter referred to as the power supply frequency. Pin 4 of IC 120 may also be used for receiving synchronization information into oscillator 227, but in the preferred embodiment of the FIGURE the synchronization information is injected into external capacitor C70.

In order to provide an improved visual presentation of video information, and to further provide the beneficial results of noise cancellation, it may be desirable to have the power supply frequency synchronized to the horizontal frequency of an incoming video signal represented by a signal SYNC IN. Cancellation is better achieved when the two frequencies bear an integer relationship to each other as opposed to a fractional relationship of integers. IC 120 may be of the type UC1846 or UC1825 made by Unitrode Corporation, Lexington, MA, USA.

Comparator 126, that operates as a switch coupled to terminal F of capacitor C11, discharges capacitor C11 completely when each pulse of signal CLOCK occurs. The output transistor of comparator 126 is coupled to filter 302 in a manner that bypasses the input terminal of filter 302 where signal $V_1$ is developed. Thus, comparator 126 causes a portion 402 of signal RAMP to be at the same level of zero volts immediately after the occurrance of the corresponding dead time pulse of signal CLOCK. This zero volt level of portion 402 exists for the duration of the positive pulse of signal CLOCK.

Signal POWER is coupled to an inverting input terminal O of an error amplifier 221 of IC 120. A non-inverting input terminal Q of amplifier 221 is coupled to reference voltage REF produced by a bandgap type voltage source 223. An output terminal R of amplifier 221 is AC-coupled through a resistor R17 and a capacitor C17, to the inverting input terminal of amplifier 221, forming an externally coupled frequency compensation network. Output terminal R is inverted and coupled internally in IC 120 to a noninverting input terminal T of a comparator 224. Signal RAMP is coupled via a 1.25 volt level shifter to a second, inverting input terminal U of comparator 224. An output terminal of comparator 224 is coupled through an "OR" gate 225 to a "SET" input terminal of a Set-Reset (R-S) flip-flop 226. Flip-flop 226 becomes set when a crossover point occurs between the level of the level shifted upramping signal RAMP at terminal U and the signal at terminal R.

Signal CLOCK and an output signal of flip-flop 226 are logically combined in an OR operation to produce a signal V that is coupled to a clock receiving terminal of a toggle flip-flop 1227. Signal V causes flip-flop 1227 to change states as a result of signal CLOCK once and only once during each period P of, for example, signal 121. A "NOR" gate 228 is responsive to an output signal W of flip-flop 1227 and to signal V for producing signal 121. Similarly, a "NOR" gate 229 is responsive to an output signal X of flip-flop 1227, that is the logical inverse of signal W, and to signal V for producing signal 122.

In steady state operation, signal CLOCK forces, both signals 121 and 122 to their respective "OFF" levels, assumming they are not already at such levels. In normal operation as the result of level shifted signal RAMP exceeding the threshold of comparator 224, flip-flop 226 causes signals 121 and 122 to be at their "OFF" level. When the trailing edge of the pulse of signal CLOCK occurs, one and only one of signals 121 or 122 changes to the "ON" level. Thus, the pulses of signals 121 and 122 occur alternately once and only once during period P in accordance with the states of flip-flop 1227 and flip-flop 226.

When one of signals 121 or 122 changes to the "ON" level, signal RAMP begins upramping, as previously described. When level shifted upramping signal RAMP at terminal U reaches the crossover point relative to the level of the signal at terminial R of amplifier 221, flop-flop 226 is set. Consequently, whichever signal, 121 or 122, that was at the "ON" level prior to the crossover point, changes after the crossover point to the "OFF" level.

The rate of change or slope of upramping portion 400 of a given pulse of signal RAMP is proportional to the peak value of corresponding pulse of current $i_1$ or $i_2$. Also the level of an error signal at output terminal R of error amplifier 221 is proportional to the difference between signal POWER and reference voltage REF. Consequently, the feedback loop which utilizes error amplifier 221, referred to herein as the outer feedback loop, is responsive to signal POWER. The outer feedback loop will cause the duty cycle of signals 121 and 122 to vary. The variation in the duty cycle, in turn, causes the duty cycle of current $i_1$ to vary in a negative feedback manner that gradually tends to force signal POWER to be at a level that is equal to voltage REF. Variation of the duty cycle is accomplished by varying the level of the error signal at the output terminal R of amplifier 221 which, other things being equal, determines the time when the crossover point in comparator 224 occurs.

Should the power in the Xenon lamp 110 increase, signal POWER will increase causing the output signal of error amplifier 221 to decrease that will in turn cause the pulses of signals 121 and 122 to decrease in width. The voltage pulse across secondary winding MS1 will concomitantly decrease in width causing less average current $i_3$ to flow in Xenon lamp 110, thus reducing the original increase in power.

In accordance with an additional aspect of the invention, actively discharging filter capacitor C11 by camparator 126, as previously discussed, improves performance of power supply 100 by reducing "squegging". Squegging is manifested by alternate pulses of voltage $V_2$ across primary winding MP of transformer T2 having a shorter duration than required, while the other alternate pulses have a longer duration than is required such that the average of the pulses is correct in width. Squegging adversely affects the frequency stability of the outer feedback loop. Squegging occurs because energy that is stored in some of the circuit elements of power supply 100 during one period P causes, in the subsequent period, the corresponding pulse of signal 121 or 122 to have a different pulse width.

If the charge in capacitor C11 were permitted to be carried forward from a given period P to the immediately following period, it might affect the pulse width of the immediately following pulse and, disadvantageously, result in squegging.

In accordance with another feature of the invention, a resistor R111 is coupled to terminal F of capacitor C11 and to a DC supply voltage energizing IC 120, that nominally is at +24 volts. During soft start operation, when currents $i_1$ and $i_2$ are still very small, the current through resistor R111 produces the upramping portion of signal RAMP. It also provides an upramping signal under no load condition should Xenon lamp 100 extinguish. The down ramping portion of signal RAMP is produced as a result of the operation of comparator 126 as it discharges capacitor C11. Thus, advantageously, signal RAMP that is required for operating IC 120 even during start-up or under no load conditions is generated as a result of the operation of comparator 126 and resistor R111 instead of as a result of the pulses of current $i_1$ and $i_2$.

Assume, hypothetically, that due to, for example, a transient change in the arc in Xenon lamp 110, a change occurs in the amplitude of current $i_1$ or $i_2$. Such change occurs at a rate determined primarily by choke L1. Because of the low-pass filtering caused by choke L1 and by the filtering in the signal paths that produce signal POWER, such change in current $i_1$ or $i_2$ will not cause an immediate, appreciable change in the level of signal POWER. Therefore, the outer feedback loop, responsive to signal POWER, may not be able to regulate the average value of currents $i_1$ and $i_2$ in a fast manner. On the other hand the rate of change of upramping portion 400 of signal RAMP that is caused by currents $i_1$ and $i_2$ will change immediately on a pulse-by-pulse basis. Thus, for example, an increase in the current in one of switches SW3 and SW4 that is then conductive will cause the rate of change of upramping portion 400 of signal RAMP immediately to increase. Therefore, the output signal of comparator 224 that changes when the crossover point occurs will cause flip-flop 226 to set earlier in the corresponding period P than if such transient increase had not occurred. The result is an immediate decrease in the pulse width of the corresponding signal 121 or 122. Advantageously, such decrease in the pulse width occurs on a pulse-by-pulse basis. Consequently, the DC current that flows in the corresponding switch of switches SW3 and SW4 that is then conductive will be immediately reduced. Such reduction in the DC current that flows in the corresponding switch will cause the average value of current $i_4$ in choke L1 to become smaller. As explained before, current $i_4$ is applied through arrangement 125 to provide the energizing current of Xenon lamp 110. Thus, IC 120 that is responsive to signal RAMP in a negative feedback manner forms an inner feedback loop that prevents fast changes in the average value of currents $i_1$ and $i_2$. The inner feedback loop has a substantially faster response time than the outer feedback loop. The outer feedback loop is slower because it includes choke L1 and capacitor C1, thus necessitating a lower bandwidth to insure frequency stability.

The inner feedback loop protects switches SW1, SW2, SW3 and SW4 from conducting excessive currents. It also, advantageously, prevents the average current in Xenon lamp 110 from significantly changing in a rapid manner. Advantageously, the inner feedback loop, operating on a pulse-by-pulse current mode basis, causes the power supply to be a current source having a high output impedance. The high output impedance occurs by default when the outer feedback loop generates signal POWER that is not representative of the power in lamp 110 either because of bandwidth or dynamic range limitations that occur during operation.

Reducing any excessive change in current $i_3$ that is coupled to Xenon lamp 110 is desirable. An excessive increase may reduce the useful lifetime of Xenon lamp 110. An excessive decrease in this current may cause the arc to extinguish. Each re-ignition that consequently follows will, disadvantageously, reduce the useful lifetime of Xenon lamp 110.

If the various parasitic capacities and other sources of the initial current spike of, for example, current $i_1$ have variations, then the spike generated with the closure of transistor switches SW2 and SW4 will be different than the one generated with the closure of transistor switches SW1 and SW3 and the magnitude of initial step 304 will also be different. After the initial spike of current, transistor switch current $i_1$ will be upramping again. Current $i_1$ increases, as current $i_4$ in choke L1 that is coupled to secondary winding MS1 of transformer T2 is reflected back to primary winding MP, with a time constant groverned mainly by the leakage inductance of transformer T2. Current $i_1$ also increases as the magnetizing current of primary winding MP increases. The increasing current due to choke L1 can vary on a cycle-to-cycle basis because of imbalances in the forward voltage drop of rectifiers D1 and D2. Ramp signal RAMP can thus vary on a cycle-to-cycle basis, because of variations in initial step 304 and/or because of slight changes in the slope of ramp 400. These cycle-to-cycle variations in the amplitude of ramp signal RAMP may result in slightly different relative times to the occurrance of threshold crossover in IC 120. This, in turn, may generate slight differences, on a cycle-to-cycle basis, in the pulse width of voltage $V_2$ across primary winding MP of transformer T2 which may cause the core of transformer T2 to operate nearer to saturation. Operation nearer to saturation will modify the normally equal contributions of the primary magnetizing inductance to the different pulses of current $i_1$. The unequal cycle-to-cycle current of the magnetizing inductance of primary winding MP is developed in a direction to cancel or reduce the cycle-to-cycle imbalance current from all other sources. An equilibrium thus exists between the cycle-to-cycle imbalance current and the degree to which the core in transformer T2 is operated near saturation. The more that the imbalance of current varies from cycle to cycle, the closer the core of transformer T2 operates to saturation.

Because it is desirable to use low cost circuit components and because of the difficulty in matching the parasitic capacities of the power transistors, being able to operate with the normally encountered imbalances is desirable. Operating with the normally encountered imbalances, however, may cause the core of transformer T2 to operate close to saturation and a severe transient such as lamp ignition, could actually drive the core into saturation.

Synchronous filter 302 responds to a current step in current $i_1$ caused by core saturation in the same manner as it responds to "noise". That is to say, it filters out the current step due to core saturation and therefore may not allow the switching transistors to be turned off in time to prevent catastrophic damage. Also the response of IC 120 to signal RAMP may be too slow for emergency shutdown purposes due to the cumulative time delays of the various required processing circuits in IC 120, and the delay in filter 302. An emergency shutdown provision may therefore be required when synchronous filter 302 is employed.

To accomplish shutdown, in accordance with a further feature of the invention, a portion of signal $V_1$ is coupled via a voltage divider 200 to a comparator 230 and to a comparator 231 of IC 120. When the peak of pulsating current $i_1$ or $i_2$ produces at an output terminal Z of voltage divider 200 a voltage that is higher than one volt, comparator 231 causes gate 225 to drive the corresponding pulse of signal 121 and 122 to the "OFF" level. Advantageously, the delay time through voltage divider 200 is much smaller than via the signal path that includes resistor R11 and capacitor C11. Comparator 231 ultimately provides current limit protection by returning signal 121 or 122 to the "OFF" level in a manner that is much faster than via the signal path of signal RAMP, thus permitting sufficiently fast emergency shutdown for many situations for which signal RAMP is too slow.

For a transient condition having a short duration it may be undersirable to cause a complete shutdown of IC 120 since such shutdown may necessitate the re-ignition of Xenon lamp 110 that may reduce its useful lifetime. On the other hand, when the peak amplitude of pulsating current $i_1$ and $i_2$ results in the voltage developed at terminal Z that is higher than 1.4 volts, which is even higher than that associated with comparator 231, comparator 230 generates a second shutdown signal SD. Signal SD not only returns signal 121 and 122 to the "OFF" level but results in reinitializing the soft start operation in IC 120. Consequently, reignition of Xenon lamp 110 may be required.

It should be understood that an arrangement similar to that of power supply 100 may be used for generating supply voltage for energizing circuit stages of a television apparatus.

What is claimed:

1. A power supply apparatus for supplying power to an arc-discharge load from an input supply voltage, the power supplied to the load manifesting itself as an output supply voltage and an output supply current at the load, comprising:

sense signal generating means for generating a sense signal that is indicative of a corresponding level of said output supply voltage and current;

a source of an oscillatory signal;

pulse-width-modulator (PWM) means coupled to the sense signal generating means and responsive to said sense signal, the PWM means for generating a pulsating drive signal having a pulse width that varies in response to said sense signal;

power switch means responsive to said drive signal and for coupling to said load for generating in said load said output supply current that is periodic and pulsating with a pulse width that varies in accordance with that of said drive signal such that a change in said sense signal causes the pulse width of a corresponding pulse of said output supply current to change in a negative feedback manner;

lowpass filter means responsive to an input signal that is indicative of said pulsating output supply current for generating at an output of said filter a ramping first portion of each pulse of a pulsating control signal the first portion ramping from a first predetermined value toward a second predetermined value and having a slope that is determined in accordance with a magnitude of output supply current on a pulse-by-pulse basis, said slope having an average slope that is established by a cutoff frequency of said lowpass filter, said pulsating control signal being coupled to said PWM means for controlling the pulse width of a corresponding pulse of said drive signal such that a given change in said magnitude of said corresponding pulse of said output supply current from a steady state magnitude thereof will cause said lowpass filter to vary said slope of said first portion, on said pulse-by-pulse basis, that in turn, for a given level of said sense signal, causes the width of said corresponding pulse of said output supply current to change in a negative feedback manner, for reducing said given change in said magnitude of said corresponding pulse of said output supply current; and means responsive to said oscillatory signal and coupled to said filter for generating a second portion of each pulse of said pulsatory control signal, the second portion directed toward the first predetermined value.

2. The apparatus according to claim 1, wherein said lowpass filter comprises an R-C network that includes a capacitance for generating said control signal in said capacitance such that said cut-off frequency of said lowpass filter is determined by said capacitance.

3. The apparatus according to claim 2, wherein said second portion generating means comprises a second switch operating at a frequency that is related to that of said oscillatory signal and coupled to said capacitance of the filter means for discharging said capacitance prior to an occurrence of each said first portion of said control signal.

4. The apparatus according to claim 3, wherein said second switch means discharges said capacitance to a predetermined level immediately prior to a beginning time of said ramping first portion of each pulse of said control signal such that a level of said control signal at said beginning time is substantially unaffected by any preceding pulse of said control signal and said output supply current, and wherein said second switch means forms with the said lowpass filter a synchronous lowpass filter.

5. The apparatus according to claim 1, wherein said power switch means is coupled in series with a winding of an output transformer and with a winding of a current sensing transformer for generating at an output of said current sensing transformer said input signal that is supplied to an input of said lowpass filter and that is representative of said magnitude of said pulse of said output supply current.

6. The apparatus according to claim 5, further comprising, a rectifier coupled to a secondary winding of said output transformer, a choke coupled to said rectifier and an output filter capacitance coupled to said choke for generating said output supply voltage across said output filter capacitance to provide an arc sustaining current for coupling to a Xenon lamp.

7. The apparatus according to claim 6, wherein said output transformer includes a third winding for developing in said third winding an AC signal that is supplied to said sense signal generating means and that is indicative of said level of said output supply voltage.

8. The apparatus according to claim 1, wherein said sense signal generating means comprises means for supplying to said load a third signal that is indicative of the level of said output supply current, means for supplying to said load a fourth signal that is indicative of the level of said output supply voltage and means for summing said third and fourth signals for generating said sense signal in accordance with a sum of said third and fourth signals such that said sense signal is indicative of a power that is developed in said load.

9. The apparatus according to claim 1, further comprising a first winding having an input coupled to an output of the power switch means, a rectifier having an input coupled to said first winding and a choke having a first terminal that is coupled to an output of said rectifier and a second terminal that is for coupling to a utilization circuit, said choke for supplying said output supply current that is rectified by the rectifier to said utilization circuit.

10. The apparatus according to claim 9, wherein said utilization circuit comprises a Xenon lamp that is energized by said rectified output supply current that sustains an arc in said Xenon lamp.

11. The apparatus according to claim 9, further comprising, a winding of a current sensing transformer coupled in series with said rectifier such that a signal that is developed at a terminal of said current sensing transformer is supplied to said sense signal generating means via said rectifier for generating said sense signal.

12. The apparatus according to claim 9, further comprising a winding of a current transformer coupled in series with said power switch and with said first winding for generating said input signal across a second winding of said current transformer that is coupled to an input terminal of said lowpass filter.

13. The apparatus according to claim 9, wherein said first winding forms a primary winding of an output transformer and wherein said rectifier is conductively coupled to a second winding of said transformer and conductively isolated from said first winding.

14. The apparatus according to claim 1, further comprising, second, third and fourth power switch means for coupling to said load and supplied by the input supply voltage such that said first, second, third and fourth power switch means operate in a full bridge chopper arrangement.

15. The apparatus according to claim 14, wherein a primary winding of an output transformer has a first terminal that is coupled between said first and second switch means and has a second terminal that is coupled between said third and fourth switch means and wherein a current sensing transformer is coupled in series with corresponding ones of said first, second, third and fourth switch means such that when two of said power switch means are conductive said input signal that is developed at a secondary winding of said current sensing transformer is at a first polarity and is representative of one of alternate pulses of said pulsating output supply current and when the other two of said power switch means are conductive said input signal at said secondary winding of said current sensing transformer is at the opposite polarity.

16. The apparatus according to claim 1, further comprising means responsive to a horizontal synchronization signal and coupled to said source of oscillatory signal for synchronizing said oscillatory signal to said horizontal synchronization signal when said load comprises a Xenon lamp that is utilized in a video projection apparatus.

17. A power supply apparatus for supplying power to a load from an input supply voltage, the power supplied to the load manifesting itself as an output supply voltage and an output supply current at the load, comprising:

sense signal generating means for generating a sense signal indicative of the value of the output supply voltage and output supply current;

pulse-width-modulator (PWM) means coupled to the sense signal generating means, the PWM means for generating a pulsating drive signal having a pulse width that varies in response to the sense signal;

power switch means coupled to the PWM means, the power switch means for supplying current to the load in response to the drive signal, such that the output supply current has a pulse width that varies directly with the pulse width of the drive signal and further wherein an increase in the value of the sense signal causes a decrease in the pulse width of the drive signal and a decrease in the value of the sense signal causes an increase in the pulse width of the drive signal;

lowpass filter means coupled to the power switch means, the lowpass filter means for generating a control signal in response to the output supply current, the control signal having a first ramping portion with a slope indicative of the magnitude of a corresponding pulse of the output supply current, such that the control signal includes a series of ramping portions determined on a pulse-by-pulse basis with respect to the output supply current, wherein the PWM means is further coupled to the lowpass filter means and the pulse width of the drive signal further varies in response to a corresponding ramping portion of the control signal, such that for a predetermined level of the sense signal the pulse width of the drive signal varies inversely with the width of the corresponding ramping portion of the control signal on a pulse-by-pulse basis, and wherein said PWM means is further coupled to the power switch means in a manner that bypasses said lowpass filter for causing an immediate reduction in the pulse width of a corresponding pulse of said drive signal when said control signal is greater than a predetermined level.

18. A power supply apparatus for supplying power to an arc-discharge load from an input supply voltage, the power supplied to the load manifesting itself as an output supply voltage and an output supply current at the load, comprising:

sense signal generating means for generating a sense signal that is indicative of a corresponding level of said output supply voltage and current;

a source of an oscillatory signal;

pulse-width modulator (PWM) means coupled to said sense signal generating means and responsive to said sense signal, the PWM means for generating a pulsating drive signal having a pulse width that varies in respose to said sense signal;

power switch means responsive to said drive signal and for supplying to said load said output supply current that is periodic and pulsating with a pulse width that varies in accordance with that of said drive signal such that a change in said sense signal resulting from a corresponding change in at least one of said output supply voltage and current causes the duty cycle of said output supply current to change in a negative feedback manner;

lowpass filter means responsive to an input signal that is indicative of said pulsating output supply current for generating at an output terminal of said filter a ramping first transition portion of each pulse of a pulsating control signal from a first predetermined value toward a second predetermined value having a slope that is determined in accordance with a magnitude of a corresponding pulse of said output supply current on a pulse-by-pulse basis, said control signal being coupled to said pulse-width-modulator for controlling the duty cycle of said drive signal such that a given change in said magnitude of said corresponding pulse of said output supply current from a steady state magnitude thereof will cause said lowpass filter to vary said slope of said ramp signal on said pulse-by-pulse basis that, in turn, for a given level of said sense signal, causes the duty cycle of said output supply current to change, in a negative feedback manner, for reducing said given change in said magnitude of said corresponding pulse of said output supply current; and second switch means responsive to said oscillatory signal and coupled to said filter output terminal for generating a second transition of each pulse of said control signal, the second transition directed toward the first predetermined value.

19. The apparatus according to claim 18, wherein said filter comprises a capacitance and further wherein said second switch means discharges said capacitance during each period of said oscillatory signal to a predetermined level.

20. A power supply apparatus for supplying an output supply voltage and an output supply current to a load from an input supply voltage, comprising:

sense signal generating means for generating a sense signal indicative of the value of the output supply voltage and output supply current;

pulse-width-modulator (PWM) means coupled to the sense signal generating means, the PWM means for generating a pulsating drive signal having a pulse width that varies in response to the sense signal;

power switch means coupled to the PWM means, the power switch means for supplying the output supply current to the load in response to the drive signal, wherein the output supply current has a pulse width that varies directly with the pulse width of the drive signal and further wherein an increase in the value of the sense signal causes a decrease in the duty cycle of the output supply current and a decrease in the value of the sense signal causes an increase in the duty cycle of the output supply current;

lowpass filter means coupled to the power switch means, the lowpass filter means including a capacitance is for generating a pulsating control signal in response to the output supply current, the control signal having a ramping first transition portion from a first predetermined value toward a second predetermined value with a slope indicative of the magnitude of a corresponding pulse of the output supply current on a pulse-by-pulse basis, the lowpass filter means further coupled to the PWM means, the PWM means for controlling the duty cycle of the drive signal on a pulse-by-pulse basis in response to the control signal such that the duty cycle of the drive signal decreases for an increase in the output supply current and the duty cycle of the drive signal increases for a decrease in the output supply current;

oscillator means coupled to the filter means, the oscillator means having an oscillating output signal for generating a second transition of each pulse of the control signal, the second transition directed toward the first predetermined value; and a current source coupled to said capacitance of said filter for charging said capacitance in a current path that bypasses a current path of said pulsating output supply current to form a ramp signal during a start-up interval in the absence of said output supply current.

21. A power supply apparatus for supplying an output supply voltage and an output supply current to a load from an input supply voltage, comprising:

sense signal generating means for generating a sense signal indicative of the value of the output supply voltage and output supply current;

pulse-width-modulator (PWM) means coupled to the sense signal generating means, the PWM means for generating a pulsating drive signal having a pulse width that varies in response to the sense signal;

power switch means coupled to the PWM means, the power switch means for supplying the output supply current to the load in response to the drive signal, wherein the output supply current has a pulse width that varies directly with the pulse width of the drive signal and further wherein an increase in the value of the sense signal causes a decrease in the duty cycle of the output supply current and a decrease in the value of the sense signal causes an increase in the duty cycle of the output supply current;

lowpass filter means coupled to the power switch means, the lowpass filter means including a capacitance is for generating a pulsating control signal in response to the output supply current, the control signal having a ramping first transition portion with a slope indicative of the magnitude of a corresponding pulse of the output supply current on a pulse-by-pulse basis, the lowpass filter means further coupled to the PWM means, the PWM means for controlling the duty cycle of the drive signal on a pulse-by-pulse basis in response to the control signal such that the duty cycle of the drive signal decreases for an increase in the output supply current and the duty cycle of the drive signal increases for a decrease in the output supply current;

oscillator means coupled to the filter means, the oscillator means having an oscillating output signal for generating a second transition of each pulse of the control signal, the second transition varying in an opposite sense to the transition of the first portion; and comparator means having an input coupled to the power switch means, the comparator means, for generating a current limit protection signal, the current limit protection signal supplied to said PWM means for causing a substantial reduction in a pulse width of said drive signal, the current limit protection signal generated when said magnitude of said corresponding pulse of said output current is greater than a predetermined value.

22. A power supply apparatus for supplying power to a load from an input supply voltage, the power supplied to the load manifesting itself as an output supply voltage and an output supply current at the load, comprising:

sense signal generating means coupled to said load for generating a sense signal that is indicative of a corresponding level of said output supply voltage and current;

pulse-width-modulator (PWM) means coupled to said sense signal generating means and responsive to said sense signal, the sense signal generating means for generating a pulsating drive signal having a pulse width that varies in response to said sense signal;

power switch means responsive to said drive signal and coupled to said load for generating in said load said output supply current that is periodic and pulsating with a pulse width that varies in accordance with that of said drive signal such that a change in said sense signal resulting from a corresponding change in at least one of said output supply voltage and current causes the duty cycle of said output supply current to change in a negative feedback manner;

lowpass filter means responsive to an input signal that is indicative of said pulsating output supply current for generating at an output terminal of said filter a ramping first portion of each pulse of a pulsating control signal having a slope that is determined in accordance with a magnitude of a corresponding pulse of said output supply current on a pulse-by-pulse basis said control signal being coupled to said pulse-width-modulator for controlling the duty cycle of said drive signal such that a given change in said magnitude of said corresponding pulse of said output supply current from a steady state magnitude thereof will cause said lowpass filter to vary said slope of said ramp signal on said pulse-by-pulse basis that, in turn, for a given level of said sense signal, causes the duty cycle of said output supply current to change in a negative feedback manner, for reducing said given change in said magnitude of said corresponding pulse of said output supply current; and means responsive to said oscillatory signal and coupled to said filter output terminal for generating a second portion of each pulse of said control signal such that prior to said ramping first portion of each pulse said control signal is established at a predetermined level that is substantially unaffected by any preceding pulse of said control signal.

* * * * *